US011542973B2

United States Patent
Takahashi et al.

(10) Patent No.: US 11,542,973 B2
(45) Date of Patent: Jan. 3, 2023

(54) CLIP

(71) Applicants: Nifco Inc., Yokosuka (JP); HONDA MOTOR CO., LTD., Tokyo (JP)

(72) Inventors: Shohei Takahashi, Yokosuka (JP); Kota Shimosato, Wako (JP)

(73) Assignees: NIFCO, Inc., Yokosuka (JP); Honda Motor Co., Ltd., Tokyo (JP)

( * ) Notice: Subject to any disclaimer, the term of this patent is extended or adjusted under 35 U.S.C. 154(b) by 426 days.

(21) Appl. No.: 16/639,875

(22) PCT Filed: Apr. 19, 2018

(86) PCT No.: PCT/JP2018/016127
§ 371 (c)(1),
(2) Date: Feb. 18, 2020

(87) PCT Pub. No.: WO2019/038990
PCT Pub. Date: Feb. 28, 2019

(65) Prior Publication Data
US 2020/0362899 A1    Nov. 19, 2020

(30) Foreign Application Priority Data

Aug. 24, 2017 (JP) .............................. JP2017161029

(51) Int. Cl.
*F16B 13/00* (2006.01)
*B60R 13/00* (2006.01)

(52) U.S. Cl.
CPC .............. *F16B 13/00* (2013.01); *B60R 13/00* (2013.01); *F16B 2013/009* (2013.01)

(58) Field of Classification Search
CPC ..... F16B 13/00; F16B 2013/009; B60R 13/00
See application file for complete search history.

(56) References Cited

U.S. PATENT DOCUMENTS

| 4,952,106 A | 8/1990 | Kubogochi et al. |
| 5,211,519 A * | 5/1993 | Saito .................. F16B 19/1081 |
| | | 411/48 |

(Continued)

FOREIGN PATENT DOCUMENTS

| CN | 2530086 Y | 1/2003 |
| CN | 1730953 A | 2/2006 |

(Continued)

OTHER PUBLICATIONS

English translation of International Search Report for International Application No. PCT/JP2018/016127, dated Jun. 19, 2018, 2 pages.

(Continued)

*Primary Examiner* — Anita M King
(74) *Attorney, Agent, or Firm* — Armstrong Teasdale LLP

(57) ABSTRACT

A purpose of the present disclosure is to provide a clip including a grommet and a pin, which does not degrade design quality and allows the clip to be removed easily from members to be attached without causing damage. The grommet is configured to be inserted into attachment holes of the members to be attached, and includes a grommet hole into which a pin is to be inserted. Depending on an insertion position of the pin relative to the grommet, the grommet undergoes elastic deformation to allow the members to be attached to each other or detached from each other. A flange portion of the grommet has an engagement hole so that the clip can be removed from the members by engaging a tool with the engagement hole.

6 Claims, 8 Drawing Sheets

(56) References Cited

U.S. PATENT DOCUMENTS

| | | | |
|---|---|---|---|
| 7,607,875 B2* | 10/2009 | Shinozaki | F16B 21/078 411/21 |
| 9,103,363 B2 | 8/2015 | Fujiwara | |
| 10,428,857 B2* | 10/2019 | Kurokawa | F16B 19/10 |
| 2002/0026693 A1* | 3/2002 | Akema | F16B 19/1081 24/453 |
| 2005/0220561 A1 | 10/2005 | Okada | |

FOREIGN PATENT DOCUMENTS

| | | |
|---|---|---|
| CN | 102459931 A | 5/2012 |
| GB | 1560521 A | 2/1980 |
| JP | 3434386 B2 | 8/2003 |
| JP | 2009191971 A | 8/2009 |
| JP | 2012137130 A | 7/2012 |

OTHER PUBLICATIONS

China First Office Action for Application CN2018800533623 dated Jan. 7, 2021; 14 pp.

* cited by examiner

Fig.8
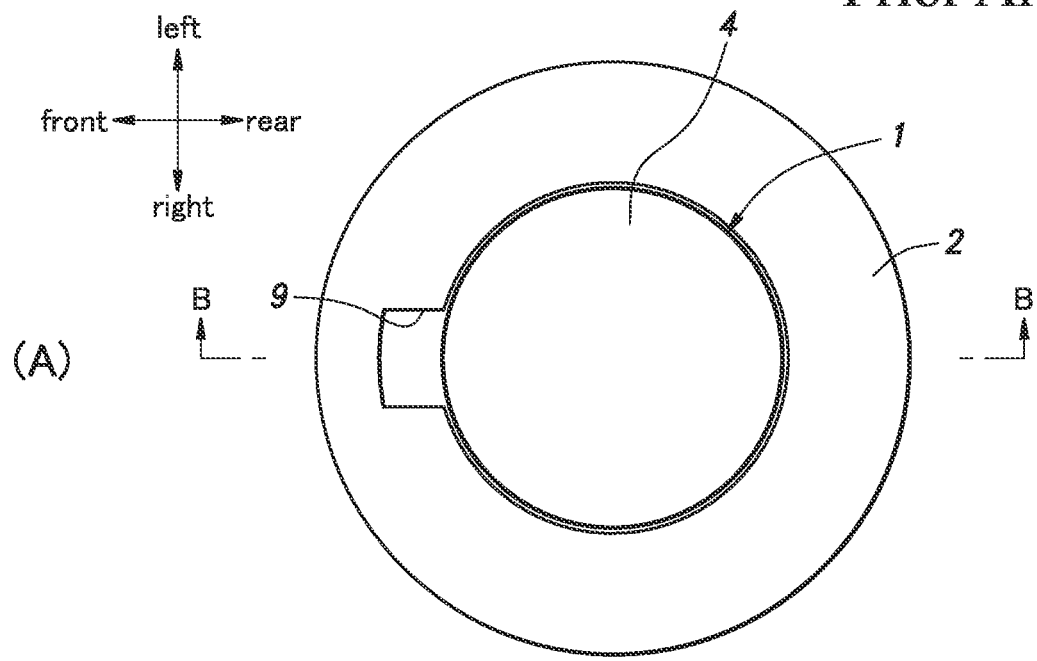
(A) Prior Art
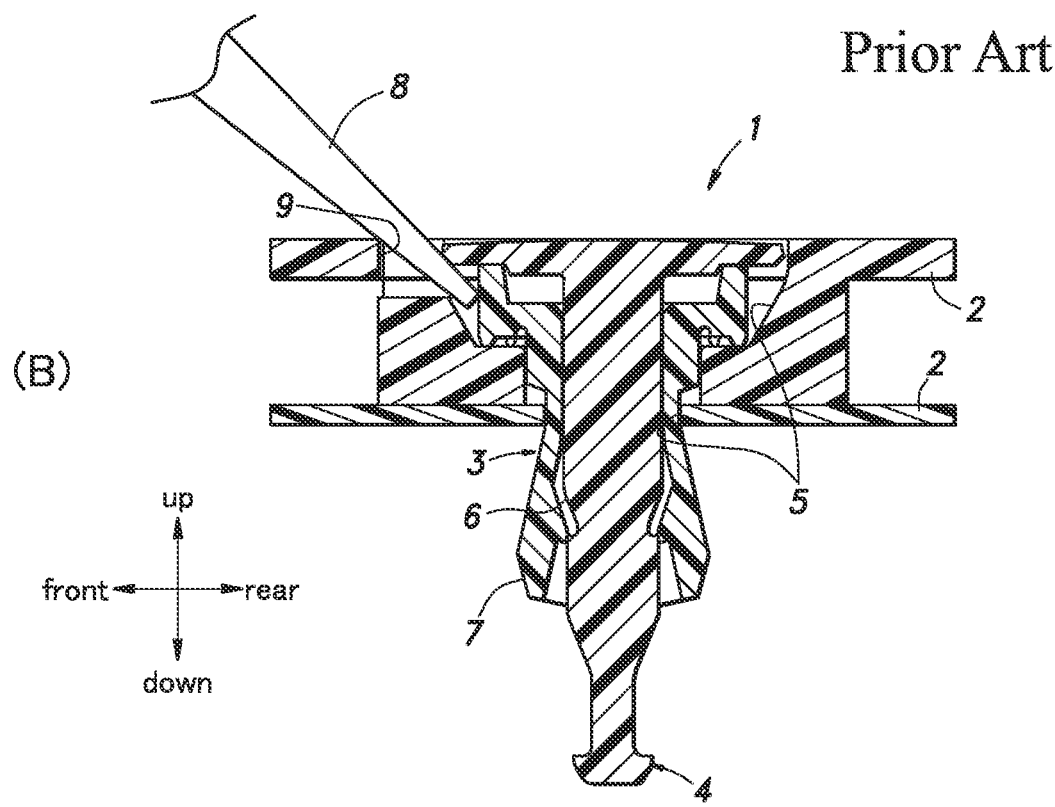
(B) Prior Art

CLIP

CROSS-REFERENCE TO RELATED APPLICATIONS

This application is a U.S. National Phase Application of PCT/JP2018/016127, filed Apr. 19, 2018, which claims the benefit of priority to JP Application No. 2017161029, filed Aug. 24, 2017, the contents of which are hereby expressly incorporated by reference in their entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present disclosure relates to a clip for connecting at least two members to each other.

DESCRIPTION OF RELATED ART INCLUDING INFORMATION DISCLOSED UNDER 37 CFR 1.97 AND 1.98

As a clip that can attach and detach two members to and from each other efficiently, clips described in Patent Documents 1 and 2 are known, for example. The clips described in Patent Documents 1 and 2 are each constituted of a grommet that can undergo elastic deformation in a tip end side portion thereof and a pin having recessed and protruding portions inserted into the grommet to guide the elastic deformation of the grommet.

FIG. 8 shows a clip 1 described in Patent Document 1. When the clip 1 described in Patent Document 1 is attached to members 2, first, with a pin 4 being inserted in a grommet 3, a tip end side of the clip 1 is inserted into attachment holes 5 of the members 2 to be attached. Subsequently, the pin 4 is advanced relative to the grommet 3 until it reaches an engagement position where a large-diameter recessed portion 6 of the pin 4 pushes elastic pieces 7 of the grommet 3 to make them protrude outward. At this time, the outer diameter of the tip end side of the grommet 3 becomes larger than the inner diameter of the attachment holes 5 of the attachment members, whereby the grommet 3 engages the members. When the pin 4 is retreated relative to the grommet 3 such that the outward deformation of the elastic pieces 7 of the grommet 3 is undone and the engagement of the grommet 3 with the member 2 is released, the clip 1 is allowed to be removed from the members 2.

When the clip described in Patent Document 2 is attached to members, the grommet is inserted into the attachment holes of the members to be attached, and further, the pin is inserted into the grommet. When the pin is advanced to the engagement position where the large-diameter recessed portion of the pin pushes the tip-side part of the grommet to make it protrude outward, the grommet engages the members in a similar manner as for the clip described in Patent Document 1. When the clip is to be removed, the pin is further advanced relative to the grommet to a release position where the tip-side part of the grommet is received in a small-diameter recessed portion of the pin. At this time, the outer diameter of the tip-side part of the grommet returns to be smaller than the inner diameter of the through-holes of the attachment members, whereby the engagement of the grommet with the members is released and the clip is allowed to be removed from the members.

Patent Document 1: JP3434386B2
Patent Document 2: JP2012-137130A

BRIEF SUMMARY OF THE INVENTION

However, in the clip described in Patent Document 1, when the clip 1 is removed, the pin 4 is caused to recede relative to the grommet 3, and therefore, it is necessary to insert a tool between the pin 4 and one of the members 2 to be attached. To prevent damage to the clip 1 and the one of the members 2 to be attached when the clip 1 is removed, as shown in FIG. 8, it is necessary to provide the one of the members 2 to be attached with an access hole 9 for inserting a tool 8, and this degrades design quality.

In the clip described in Patent Document 2 also, it is difficult to remove the clip without using a tool, and in order to remove the clip easily, it is necessary to insert the tool between the clip and one of the members to be attached after pushing the pin to the release position. Therefore, as in the clip 1 of Patent Document 1, to prevent damage to the clip and the one of the members to be attached when the clip is removed, it is necessary to provide the one of the members to be attached with an access hole for inserting the tool, and this degrades design quality.

In view of such problems, an object of the present invention is to provide a clip including a grommet and a pin, which does not degrade design quality and allows the clip to be removed easily from the members to be attached without causing damage.

A clip (11) according to at least some embodiments of the present invention is a clip for attaching at least two members (14, 15) to each other, comprising: a grommet (12) including a body portion (16) configured to be inserted into an attachment hole (14a, 15a) provided in each of the at least two members, a flange portion (17) provided on a base end side of the body portion with respect to an axial direction, and a grommet hole (18) including a flange recess (18a) provided in the base end side of the flange portion and an insertion hole (18b) extending from a bottom of the flange recess to a tip end of the body portion; and a pin (13) including a shaft portion (24) configured to be inserted into the insertion hole and a head portion (25) provided on the base end side of the shaft portion, wherein the body portion has at least two elastic pieces (20) extending in the axial direction so as to be capable of engaging a peripheral edge of the attachment hole by elastic deformation, the pin is configured to be capable of advancing relative to the grommet from an engagement position where the elastic pieces are caused to undergo elastic deformation to engage the peripheral edge of the attachment hole to a release position where engagement of the elastic piece with the peripheral edge of the attachment hole is released, and an inner circumferential surface of the grommet hole is provided with an engagement portion (23, 33) that can be engaged by a tool to apply a force in a removing direction in the release position, and the head portion is located on a tip end side of at least a part of the engagement portion with respect to the axial direction in the release position.

According to this configuration, it is possible to remove the clip from the first and second members easily without providing the first member with an access hole (9) and without causing damage to the clip and the first member.

The clip according to at least some embodiments of the present invention is characterized by that, in the above configuration, the engagement portion is formed in the flange recess, and the head portion has a part located on the base end side of the engagement portion in the engagement position.

According to this configuration, in the engagement position where the first and second members are attached to each other by the clip, the engagement portion is hidden from view by the head portion, and therefore, regardless of the size and shape of the engagement portion, design quality of the clip is not degraded, and in the release position for removing the clip, it is possible to engage the tool with the engagement portion without being hindered by the head portion.

The clip according to at least some embodiments of the present invention is characterized by that, in any of the above configurations, the engagement portion has a part recessed outward from the inner circumferential surface.

According to this configuration, by simply inserting a tool such as a flat-blade screwdriver into the engagement recessed portion, it is possible to engage the tool with the engagement recessed portion, and therefore, the removal work of the clip is easy compared to a case where a tool such as a nipper is used to grip an engagement portion consisting of a protrusion or the like.

The clip according to at least some embodiments of the present invention is characterized by that, in the above configuration, the engagement portion has an engagement hole (23) outwardly extending through from the inner circumferential surface.

According to this configuration, the formation of the engagement hole is easy in relation to parting of the mold for injection molding.

The clip according to at least some embodiments of the present invention is characterized by that, in the configuration having the aforementioned engagement portion, the engagement portion has a bottomed engagement groove (33) extending over an entire circumference of the inner circumferential surface.

According to this configuration, it is possible to insert the tool into the engagement groove from all directions, whereby the operability is improved.

The clip according to at least some embodiments of the present invention is characterized by that, in any of the above configurations, the elastic pieces are constituted of a pair of elastic pieces opposing each other with the shaft portion interposed therebetween, each of the elastic pieces has an abutment surface (21) configured such that, if the attachment hole of one of the at least two members that is located closest to the tip end side is an elongated hole, the abutment surface abuts against a wall surface part defining a shorter diameter of the elongated hole in the engagement position, and a guide surface (22) formed to project outward relative to a part on the tip end side, the guide surface includes a first guide surface (22a) extending from the abutment surface to one side edge of the elastic piece in such a manner that the first guide surface extends toward the base end side as the first guide surface approaches the one side edge and a second guide surface (22b) located closer to the base end side than the first guide surface is and extending from another side edge of the elastic piece to the abutment surface in such a manner that the second guide surface extends toward the base end side as the second guide surface approaches the abutment surface, and the second guide surface of each of the pair of elastic pieces is located closer to the base end side than an extension line of the first guide surface of another elastic piece is.

According to this configuration, when the grommet is inserted into the second attachment hole while the guide surface is made slide on the upper end of the wall surface part defining the shorter diameter of the second attachment hole, even though the grommet is inclined relative to the axial direction, the end portion of the second guide surface is prevented from being caught by the upper end of the wall surface part defining the second attachment hole when the object that slides on the wall surface part switches from the first guide surface to the second guide surface, whereby smooth insertion of the grommet is achieved.

According to the present invention, it is possible to provide a clip including a grommet and a pin, which does not degrade design quality and allows the clip to be removed easily from the members to be attached without causing damage.

BRIEF DESCRIPTION OF THE SEVERAL VIEWS OF THE DRAWINGS

FIG. 8A shows a plan view of a clip of the prior art;

FIG. 8B shows a sectional view taken along line B-B in FIG. 8A.

DETAILED DESCRIPTION OF THE INVENTION

Figure 1:
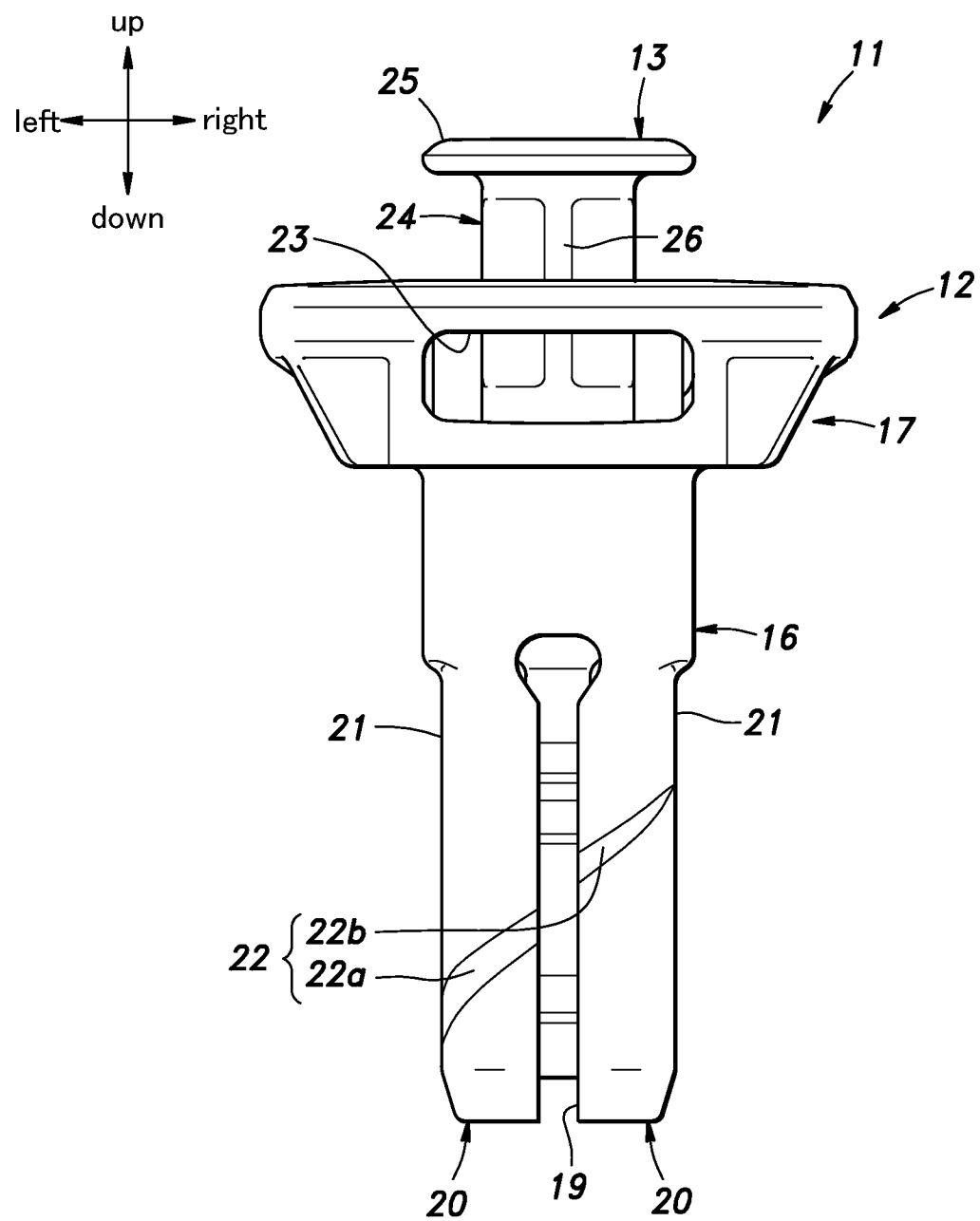
FIG. 1 is a front view of a clip according to an embodiment.

In the following, a clip 11 according to an embodiment of the present invention will be described with reference to the drawings. It is to be noted, that for the purpose of description, the vertical, lateral, and fore-and-aft directions are denoted in the drawings, but the installation direction of the clip 11 when actually attached may be different from the illustrated direction. Also, the directions toward and away from the center axis of the clip 11 will be referred to as inward and outward directions, respectively.

Figure 5:
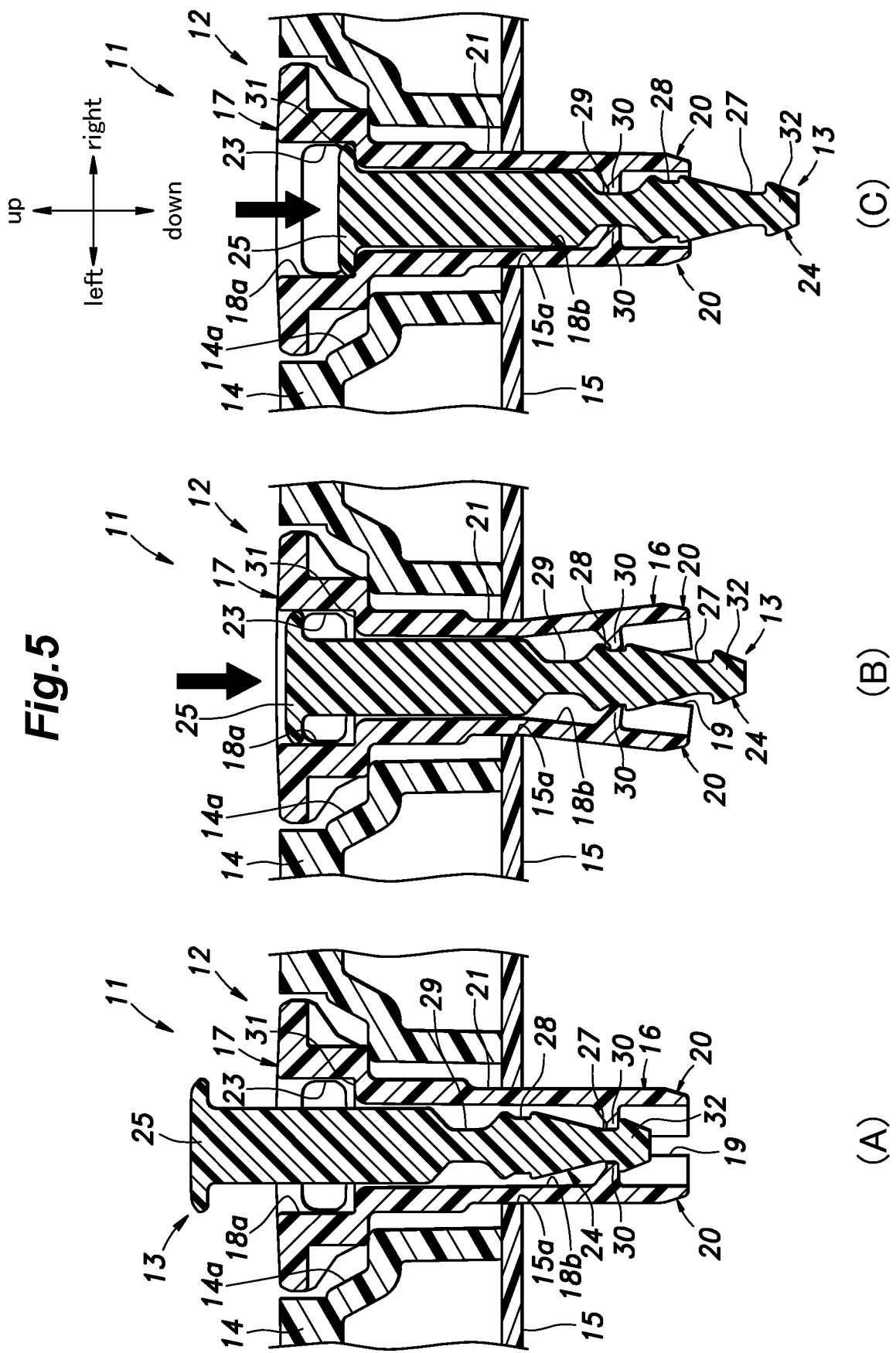
FIG. 5A is a sectional view showing, in an initial position, an attachment and removal process of the clip according to the embodiment.
FIG. 5B is a sectional view showing, in an engagement position, an attachment and removal process of the clip according to the embodiment.
FIG. 5C is a sectional view showing, in a release position, an attachment and removal process of the clip according to the embodiment.

As shown in FIG. 1, the clip 11 according to the embodiment includes a grommet 12 and a pin 13 configured to be inserted into the grommet 12. The grommet 12 and the pin 13 are each an injection molding article made of resin such as polyoxymethylene (polyacetal), polyethylene, or the like. As shown in FIG. 5, the clip 1 is used to join a first member 14 positioned on an upper side and a second member 15 positioned on a lower side to each other. For instance, the first member 14 is a vehicle cowl tope and the second member 15 is a vehicle body. The clip 1 is inserted into a first attachment hole 14a provided in the first member 14 and a second attachment hole 15a provided in the second member 15.

Figure 2:
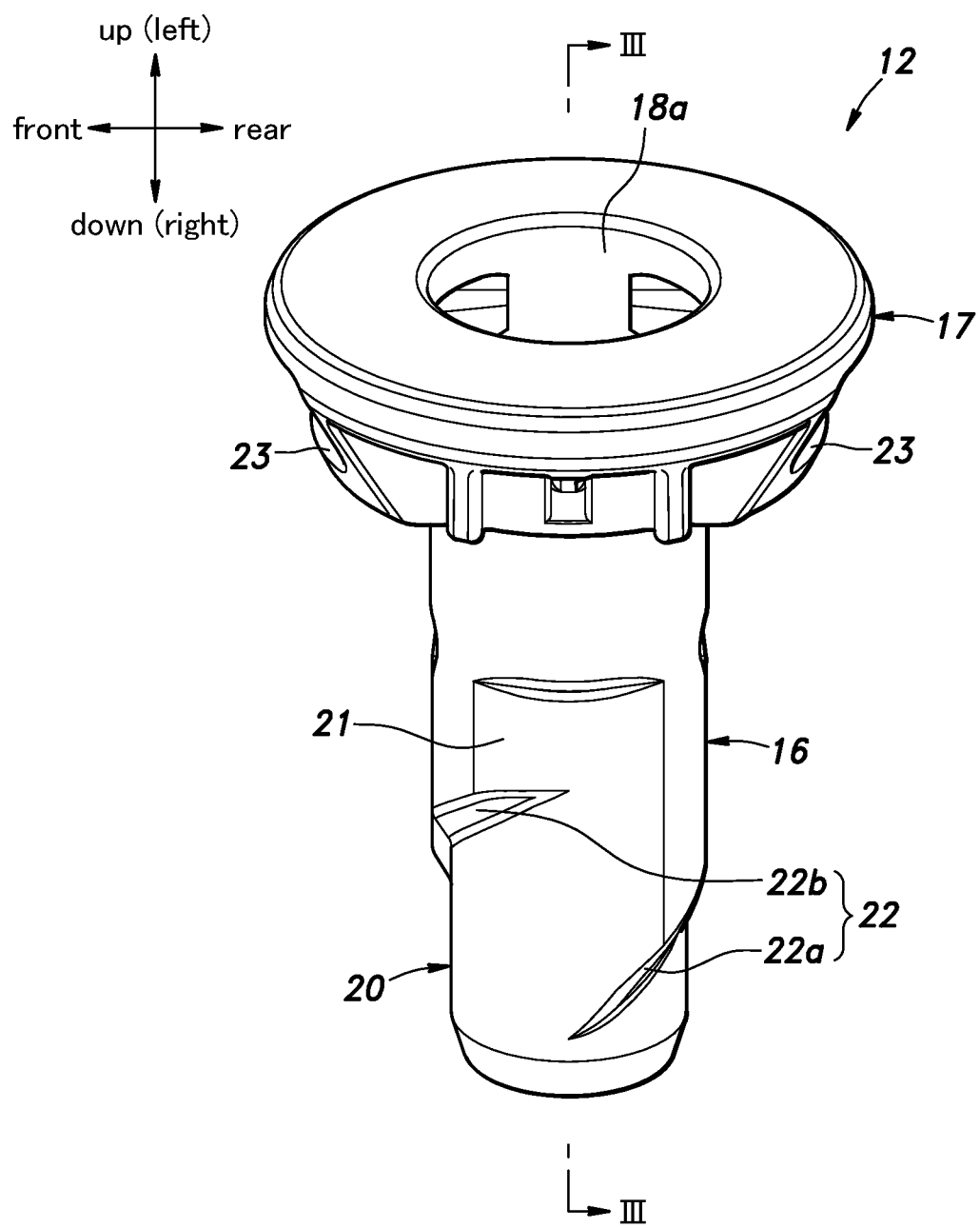
FIG. 2 is a perspective view of a grommet according to the embodiment.
Figure 3:
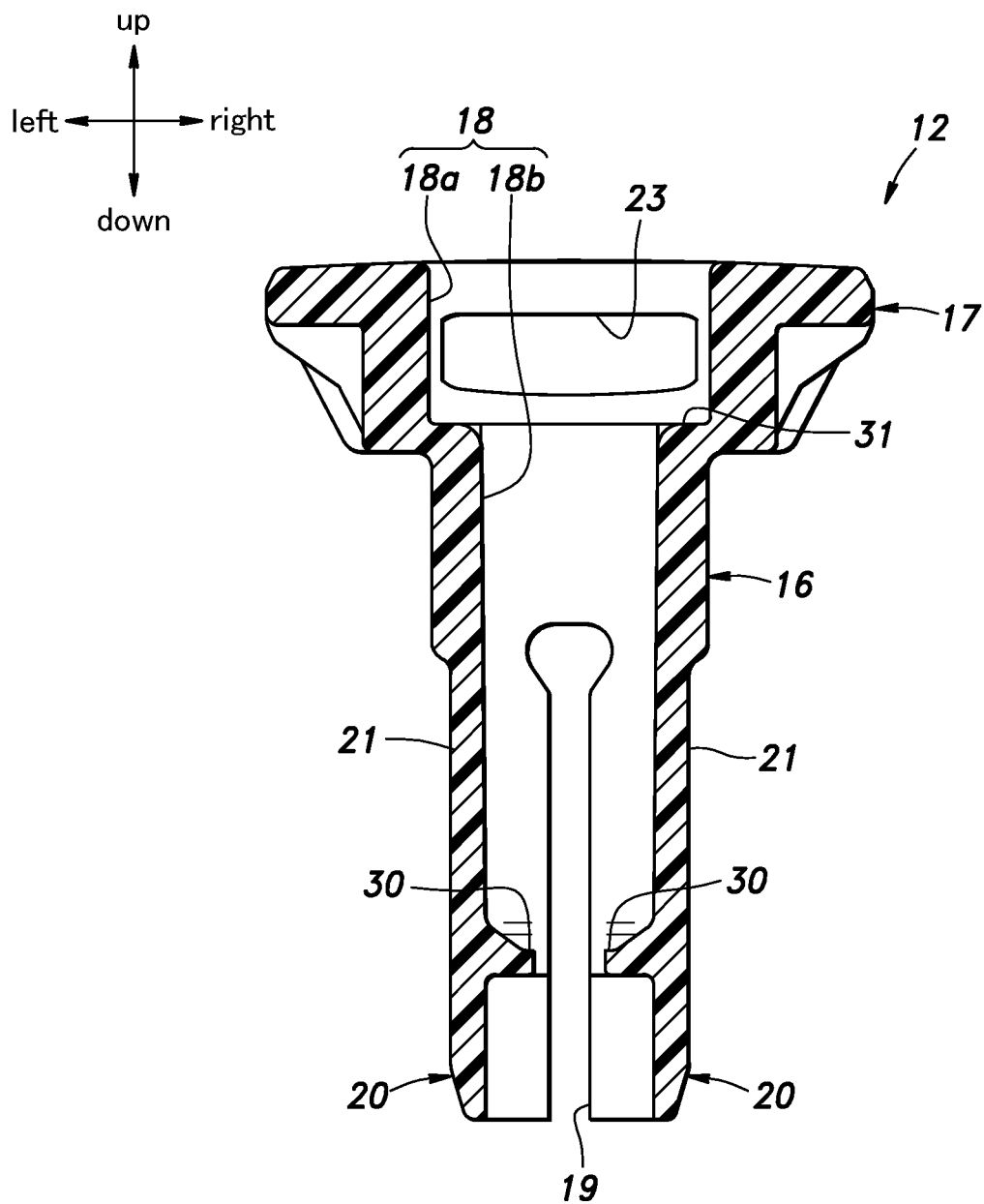
FIG. 3 is a sectional view taken along line in FIG. 2.

As shown in FIGS. 2 and 3, the grommet 12 includes a body portion 16 having an axial direction coinciding with the vertical direction and a flange portion 17 provided on an upper side (base end side with respect to the axial direction) of the body portion 16. The grommet 12 is formed with a grommet hole 18 extending through the body portion 16 and the flange portion 17 in the axial direction, and the grommet hole 18 includes a flange recess 18a formed in an upper surface of the flange portion 17 and an insertion hole 18b extending from the bottom of the flange recess 18a to the tip end of the body portion 16. The grommet 12 has rotational symmetry in that the grommet 12 has the same shape after being rotated 180 degrees about the axis.

The body portion 16, which is substantially cylindrical in shape, is formed with slits 19 extending upward from the lower end in front and rear parts thereof, so that the parts divided by the slits 19 form a pair of left and right elastic pieces 20, 20 each having an upper end side supported in a cantilever fashion and extending in the axial direction. The pair of left and right elastic pieces 20, 20 can undergo elastic deformation such that the lower sides thereof (tip end sides with respect to the axial direction) spread outward with the upper ends thereof serving as fulcrums.

The second attachment hole 15a of the second member 15 is an elongated hole having a longer diameter extending in the fore-and-aft direction and a shorter diameter extending in the lateral direction. As shown in FIGS. 2, 3, and 5, The grommet 12 is provided with a pair of left and right abutment surfaces 21, 21 configured to abut against wall surface parts defining the shorter diameter of the second attachment hole 15a of the second member 15. Each abutment surface 21 forms an outer surface of the corresponding elastic piece 20.

The outer surface of each elastic piece 20 has an upper portion formed to bulge relative to a lower portion as viewed along the vertical direction. A guide surface 22 separating the upper and lower portions is formed to project relative to the lower region to guide the grommet 12 when the clip 11 is inserted into the second attachment hole 15a such that the lateral direction of the grommet 12 coincides with the shorter diameter direction of the second attachment hole 15a. It is to be noted that the guide surface 22 may be formed as a protrusion instead of as a result of bulging of the upper region relative to the lower region. The guide surface 22 includes a first guide surface 22a extending from the abutment surface 21 to one side edge of the elastic piece 20 (the rear side edge of the right elastic piece 20 and the front side edge of the left elastic piece 20) in such a manner that the first guide surface 22a extends upward as it approaches the one side edge and a second guide surface 22b located higher than the first guide surface 22a and extending from the other side edge of the elastic piece 20 (the front side edge of the right elastic piece 20 and the rear side edge of the left elastic piece 20) to the abutment surface 21 in such a manner that the second guide surface 22b extends upward as it approaches the abutment surface 21.

When the clip 11 is inserted into the second attachment hole 15a, by rotating the clip 11 about the axis such that the guide surfaces 22 respectively slide on the upper ends of the wall surface parts defining the shorter diameter of the second attachment hole 15a of the second member 15, the lateral direction of the inserted grommet 12 coincides with the shorter diameter direction of the second attachment hole 15a. Here, because the guide surfaces 22 are divided by the slit 19, if the second guide surface 22b is on an extension line of the first guide surface 22a, the grommet 12 during insertion may be inclined such that the side edges of the elastic pieces 20 may get caught before each second guide surface 22b begins to slide on the upper end of the associated wall surface part defining the shorter diameter of the second attachment hole 15a of the second member 15. Therefore, as shown in FIG. 1, the second guide surface 22b of each elastic piece 20 is preferably located above the extension line of the first guide surface 22a of the other elastic piece 20. With such a configuration, when the object that slides on the upper end of each wall surface part defining the shorter diameter of the second attachment hole 15a of the second member 15 switches from the first guide surface 22a to the second guide surface 22b, no catching occurs and the grommet 12 can be inserted into the second attachment hole 15a smoothly.

As shown in FIGS. 1 to 3, the flange portion 17 is substantially annular in shape and has an outer diameter larger than the minimum inner diameter of the first attachment hole 14a so that the flange portion 17 does not pass through the first attachment hole 14a of the first member 14. The flange portion 17 is formed with a pair of engagement holes 23, 23 extending through the inner circumferential surface of the flange recess 18a and the outer circumferential surface of the flange portion 17, where each engagement hole 23 serves as an engagement portion for engaging a removing tool 8 (see FIG. 6) is engaged when the clip 11 is to be pulled out. In the present embodiment, each of the pair of engagement holes 23, 23 is provided to extend through the flange portion 17 along the fore-and-aft direction, but it may be provided to extend along the lateral direction or another direction so long as it extends through the flange portion 17 in the inward and outward direction. Also, it is also possible to provide a single engagement hole 23 or more than two engagement holes.

Figure 4:
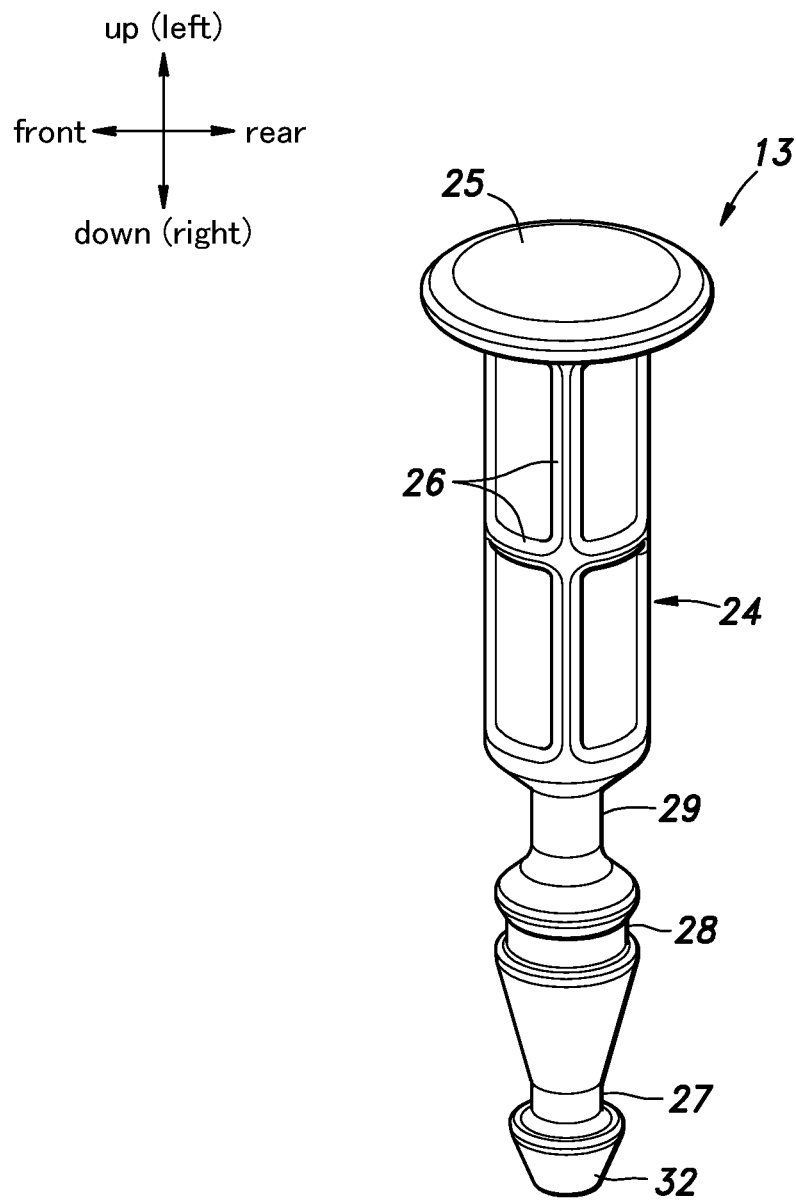
FIG. 4 is a perspective view of a pin according to the embodiment.

As shown in FIG. 4, the pin 13 includes a shaft portion 24 extending in the vertical direction and configured to be inserted into the insertion hole 18b and a disk-shaped head portion 25 provided on an upper side of the shaft portion 24 and having a diameter larger than that of the shaft portion 24. The cross-section of the pin 13 perpendicular to the vertical direction is circular except for the part where ribs 26 are formed by lightening. As shown in FIG. 5, the shaft portion 24 has first to third recessed portions 27, 28, 29 in this order from below, and the first to third recessed portions 27, 28, 29 are being capable of engaging engagement claws 30 formed to project inward from the inner surfaces of lower parts of the respective elastic pieces 20 of the grommet 12.

The inner diameter of the flange recess 18a is larger than the inner diameter of the insertion hole 18b, and consequently, an annular engagement surface 31 facing upward is formed in the bottom of the flange recess 18a. The engagement surface 31 is located lower than the engagement holes 23. The maximum outer diameter of the shaft portion 24 is smaller than the inner diameter of the grommet hole 18 other than the part where the engagement claws 30 are formed, so that the shaft portion 24 can be inserted into the grommet hole 18. The outer diameter of the head portion 25 is smaller than the inner diameter of the flange recess 18a and larger than the inner diameter of the insertion hole 18b, and therefore, the head portion 25 can enter the flange recess 18a till the head portion 25 is engaged by the engagement surface 31. When the head portion 25 is engaged by the engagement surface 31, the upper surface of the head portion 25 is located below the upper surfaces of the engagement holes 23.

A lower end portion 32 of the shaft portion 24 has a frustoconical shape having a surface inclined outward in the upward direction such that when the shaft portion 24 is inserted into the grommet hole 18 from above, the shaft portion 24 can pass between the engagement claws 30 by pushing the engagement claws 30 outward.

The lower end portion 32 defines an annular upper surface that forms a lower side surface of the first recessed portion 27. The outer diameter at the bottom of the first recessed portion 27 is smaller than the distance between the tip ends of the pair of engagement claws 30, 30 when the pair of elastic pieces 20, 20 are not in elastic deformation, whereby in a position where the pair of engagement claws 30, 30 engage the first recessed portion 27 (initial position), the pair of elastic pieces 20, 20 are not in elastic deformation. When the pin 13 is placed in the initial position relative to the grommet 12, the lower end of the shaft portion 24 is located higher than the lower end of the body portion 16, and the head portion 25 is located higher than the flange portion 17. An upper side surface of the first recessed portion 27 with respect to the bottom thereof is inclined outward in the upward direction.

A lower side surface of the second recessed portion 28 is formed to extend inward from the upper end of the upper side surface of the first recessed portion 27. The outer diameter at the bottom of the second recessed portion 28 is larger than the distance between the tip ends of the pair of engagement claws 30, 30 when the pair of elastic pieces 20, 20 are not in elastic deformation. Thus, in a position where the pair of engagement claws 30, 30 engage the second recessed portion 28 (engagement position), the pair of elastic pieces 20, 20 undergo elastic deformation such that the lower end sides thereof deflect outward. An upper side surface of the second recessed portion 28 with respect to the bottom thereof is inclined outward in the upward direction, and the inclination angle thereof relative to the vertical direction is larger than that of the upper side surface of the first recessed portion 27. When the pin 13 is placed in the engagement position relative to the grommet 12, the lower end of the shaft portion 24 is located lower than the lower end of the body portion 16, and the upper surface of the head portion 25 is substantially flush with the upper surface of the flange portion 17.

Upper and lower side surfaces of the third recessed portion 29 with respect to the bottom thereof each form an obtuse angle relative to the bottom as viewed in the vertical cross section. The outer diameter at the bottom of the third recessed portion 29 is smaller than the distance between the tip ends of the pair of engagement claws 30, 30 when the pair of elastic pieces 20, 20 are not in elastic deformation, whereby in a position where the pair of engagement claws 30, 30 engage the third recessed portion 29 (release position), the pair of elastic pieces 20, 20 are not in elastic deformation. When the pin 13 is placed in the release position relative to the grommet 12, the lower end of the shaft portion 24 is located lower than the lower end of the body portion 16, and the head portion 25 is located lower than the upper surface of the flange portion 17 and is in contact with the engagement surface 31.

Figure 6:
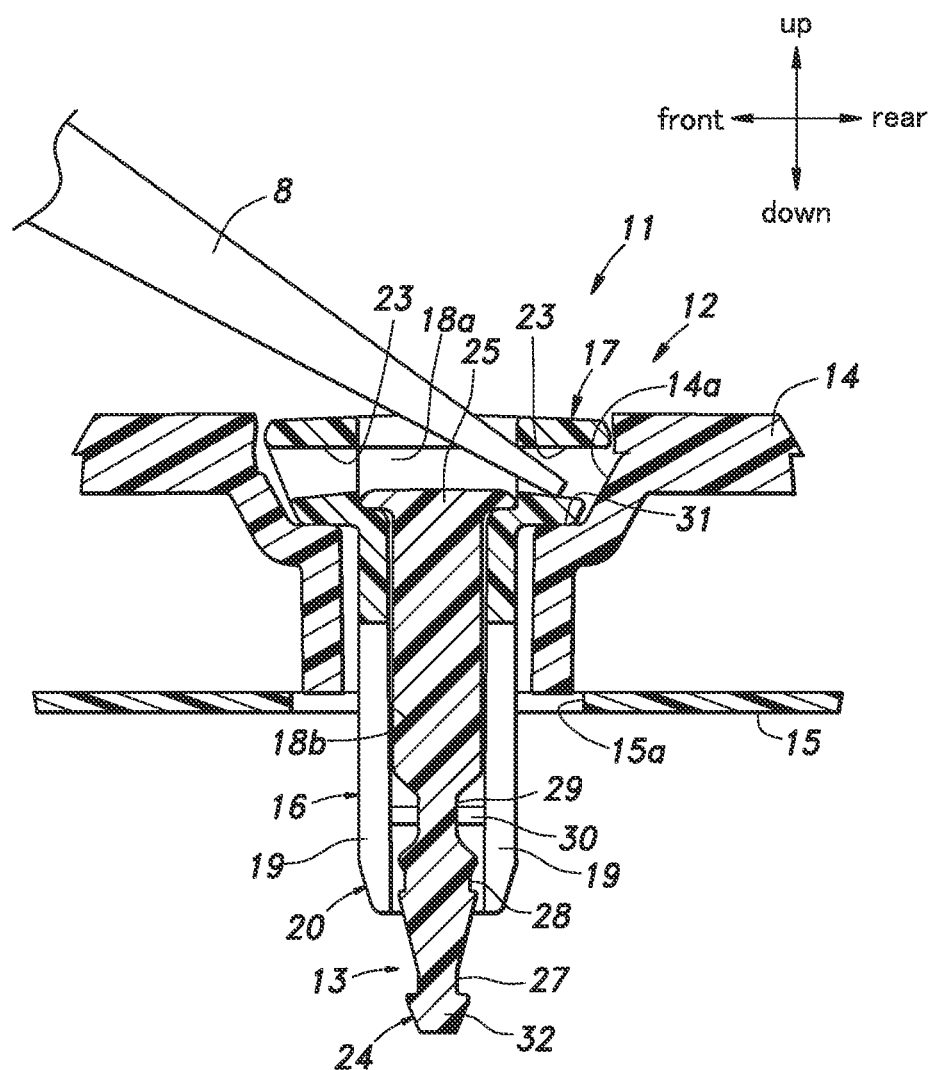
FIG. 6 is a sectional view showing a way of removing the clip according to the embodiment.

With reference to FIGS. 5 and 6, description will now be made of the procedure for attaching and removing the clip 11 and the function of the same. It is to be noted that FIG. 5 is a vertical sectional view taken along a section plane containing the lateral direction while FIG. 6 is a vertical sectional view taken along a section plane containing the fore-and-aft direction. A manufacturer of the clip 11 or a worker who is going to attach the first member 14 and the second member 15 to each other inserts the pin 13 into the grommet hole 18 from above in advance to make the pair of engagement claws 30, 30 engage the first recessed portion 27 and thereby to make an assembly of the grommet 12 and the pin 13.

In this initial position, the pair of elastic pieces 20, 20 are not in elastic deformation, and therefore, the outer diameter of the body portion 16 of the grommet 12 is smaller than the inner diameter of the first attachment hole 14a of the first member 14 and the longer diameter of the second attachment hole 15a of the second member 15. Also, the lateral width of the body portion 16 (the distance between the pair of abutment surfaces 21, 21) is smaller than the shorter diameter of the second attachment hole 15a, and the outer diameter formed by the part other than the abutment surfaces 21 is smaller than the shorter diameter of the second attachment hole 15a in the region lower than the guide surface 22 and is larger than the shorter diameter of the second attachment hole 15a in the region higher than the guide surface 22.

As shown in (A) of FIG. 5, the worker first places the first member 14 and the second member 15 one over the other such that the first attachment hole 14a and the second attachment hole 15a align each other, and inserts the grommet 12 with the pin 13 held therein into the first attachment hole 14a and the second attachment hole 15a from above. Since the relationship between the size of the body portion 16 and the sizes of the first attachment hole 14a and the second attachment hole 15a in the initial position is as described above, it is possible to insert the grommet 12 into the first attachment hole 14a and the second attachment hole 15a such that the lateral direction of the grommet 12 coincides with the shorter diameter direction of the second attachment hole 15a and the flange portion 17 abuts against the first member 14 by rotating the grommet 12 about the axis so as to make the guide surfaces 22 slidably contact the upper end of the wall surface defining the second attachment hole 15a.

Subsequently, as shown in (B) of FIG. 5, the head portion 25 is pushed downward to advance the pin 13 relative to the grommet 12 from the initial position so that the second recessed portion 28 engages the pair of engagement claws 30, 30. In this engagement position, the bottom of the second recessed portion 28 pushes the pair of engagement claws 30, 30 outward, and the pair of elastic pieces 20, 20 elastically deform outward to bend with the upper end sides thereof serving as fulcrums. The lateral distance between the outer surfaces of the pair of elastic pieces 20, 20 in the elastic deformation is larger than the shorter diameter of the second attachment hole 15a, and therefore, the body portion 16 is held in the first attachment hole 14a and the second attachment hole 15a, and the first member 14 and the second member 15 are attached to each other. Further, the upper surface of the head portion 25 of the pin 13 is positioned substantially flush with the upper surface of the flange portion 17 of the grommet 12, resulting in favorable design quality.

To release the attachment between the first member 14 and the second member 15, as shown in (C) of FIG. 5, the head portion 25 is pushed downward to further advance the pin 13 from the engagement position so that the third recessed portion 29 engages the engagement claws 30. In this release position, the relationship between the outer diameter of the body portion 16 and the sizes of the first attachment hole 14a and the second attachment hole 15a is the same as in the initial position. Therefore, it is possible to pull out the clip 11 upward from the first attachment hole 14a and the second attachment hole 15a. In the release position, the head portion 25 of the pin 13 enters into the flange recess 18a and is engaged by the engagement surface 31.

In the release position, the upper surface of the head portion 25 is located lower than the upper surfaces of the engagement holes 23, and thus, as shown in FIG. 6, it is possible to make the tool 8 such as a flat-blade screwdriver engage the upper surface of one engagement hole 23 via the flange recess 18a and to apply a force in the removing direction (upward direction) to the grommet 12. Therefore, without providing the first member 14 with an access hole 9 of the prior art as shown in FIG. 8, and even if the lower surface of the flange portion 17 is brought into close contact with the first member 14 to improve the design quality, it is possible to remove the clip 11 from the first member 14 and the second member 15 to release the attachment between the first member 14 and the second member 15 without causing damage to the first member 14.

In the release position and the engagement position, the lower end of the pin 13 is located lower than the lower end of the grommet 12, and therefore, it is possible to push the lower end of the pin 13 upward such that the pin 13 recede relative to the grommet 12 to return to the initial position. The pulled-out clip 11 can be reused.

Further, since the engagement holes 23 consist of through-holes, the formation of the engagement holes 23 is easy in relation to parting of the mold for injection molding. In addition, since the pair of engagement holes 23, 23 are hidden from view by the head portion 25 in the engagement position, even if the engagement holes 23, 23 are made large, the design quality is not impaired.

Figure 7:
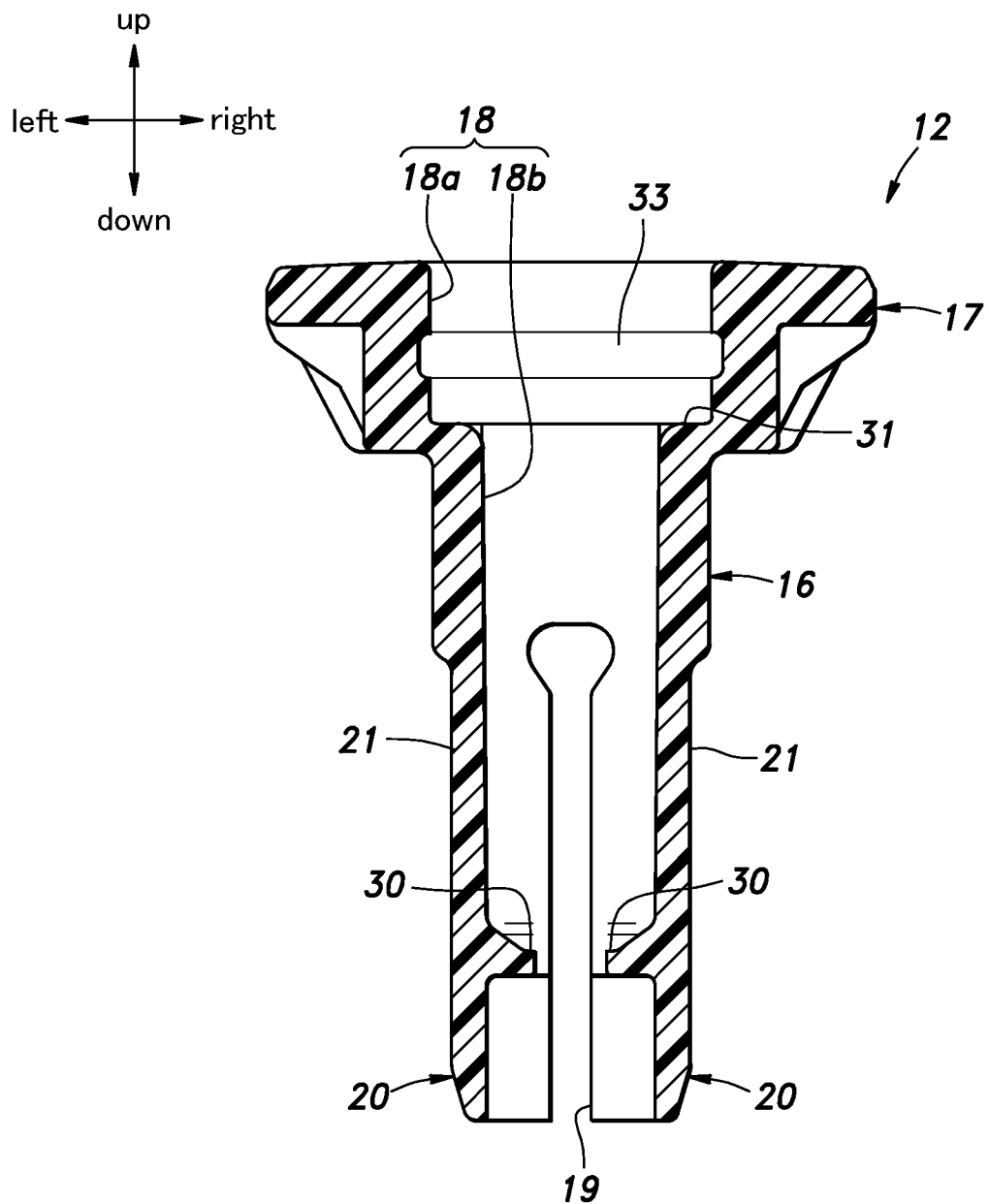
FIG. 7 is a sectional view showing a modification of the grommet.

FIG. 7 shows a modification of the grommet 12. In this modification, the shape of the engagement portion for engagement by the tool 8 (see FIG. 6) is different from the above embodiment. The other features are common with the above embodiment, and therefore, description thereof will be omitted. The grommet 12 of the modification includes, instead of the engagement holes 23 (see FIG. 3), a bottomed engagement groove 33 that extends over the entire circumference of the inner circumferential surface of the flange recess 18a. In the release position, the head portion 25 is located lower than the engagement groove 33. The engagement groove 33 extending over the entire circumference allows the tool 8 to be inserted therein from all directions, thereby achieving favorable operability.

A concrete embodiment has been described in the foregoing, but the present invention is not limited to the above embodiment and may be modified or altered in various ways. Instead of the engagement recessed portion such as the engagement hole or the engagement groove, a protrusion that can be engaged by a tool such as a nipper may be provided. Also, the head portion may enter into the insertion hole in the release position, and in this case, the engagement portion, such as the engagement hole, the engagement groove, or the protrusion, may be provided in the insertion hole so long as a part to be engaged by the tool is located above the head portion in the release position. The second attachment hole does not have to be an elongated hole. The clip may be configured to attach together three or more attachment members. The entire content of the prior art referred to in the present application is herein incorporated by reference.

Glossary

11: clip
12: grommet
13: pin
14: first member (14a: first attachment hole)
15: second member (15a: second attachment hole)
16: body portion
17: flange portion
18: grommet hole (18a: flange recess, 18b: insertion hole)
20: elastic piece
21: abutment surface
22: guide surface (22a: first guide surface, 22b: second guide surface)
23: engagement hole
24: shaft portion
25: head portion
27: first recessed portion
28: second recessed portion
29: third recessed portion
30: engagement claw
31: engagement surface
33: engagement groove

The invention claimed is:

1. A clip for attaching at least two members to each other, comprising:
   a grommet including a body portion configured to be inserted into an attachment hole provided in each of the at least two members, a flange portion provided on a base end side of the body portion with respect to an axial direction, and a grommet hole including a flange recess provided in the base end side of the flange portion and an insertion hole extending from a bottom of the flange recess to a tip end of the body portion; and
   a pin including a shaft portion configured to be inserted into the insertion hole and a head portion provided on the base end side of the shaft portion,
   wherein the body portion has at least two elastic pieces extending in the axial direction so as to be capable of engaging a peripheral edge of the attachment hole by elastic deformation,
   the pin is configured to be capable of advancing relative to the grommet from an engagement position where the elastic pieces are caused to undergo elastic deformation to engage the peripheral edge of the attachment hole to a release position where engagement of the elastic piece with the peripheral edge of the attachment hole is released, and
   an inner circumferential surface of the grommet hole is provided with an engagement portion that can be engaged by a tool to apply a force in a removing direction in the release position, and the head portion is located on a tip end side of at least a part of the engagement portion with respect to the axial direction in the release position.

2. The clip according to claim 1, wherein the engagement portion is formed in the flange recess, and
the head portion has a part located on the base end side of the engagement portion in the engagement position.

3. The clip according to claim 2, wherein the engagement portion has a part recessed outward from the inner circumferential surface.

4. The clip according to claim 3, wherein the engagement portion has an engagement hole outwardly extending through from the inner circumferential surface.

5. The clip according to claim 3, wherein the engagement portion has a bottomed engagement groove extending over an entire circumference of the inner circumferential surface.

6. The clip according to claim 1, wherein the elastic pieces are constituted of a pair of elastic pieces opposing each other with the shaft portion interposed therebetween,
each of the elastic pieces has an abutment surface configured such that, if the attachment hole of one of the at least two members that is located closest to the tip end side is an elongated hole, the abutment surface abuts against a wall surface part defining a shorter diameter of the elongated hole in the engagement position, and a guide surface formed to project outward relative to a part on the tip end side,
the guide surface includes a first guide surface extending from the abutment surface to one side edge of the elastic piece in such a manner that the first guide surface extends toward the base end side as the first guide surface approaches the one side edge and a second guide surface located closer to the base end side than the first guide surface is and extending from another side edge of the elastic piece to the abutment surface in such a manner that the second guide surface extends toward the base end side as the second guide surface approaches the abutment surface, and
the second guide surface of each of the pair of elastic pieces is located closer to the base end side than an extension line of the first guide surface of another elastic piece is.

* * * * *